UNITED STATES PATENT OFFICE.

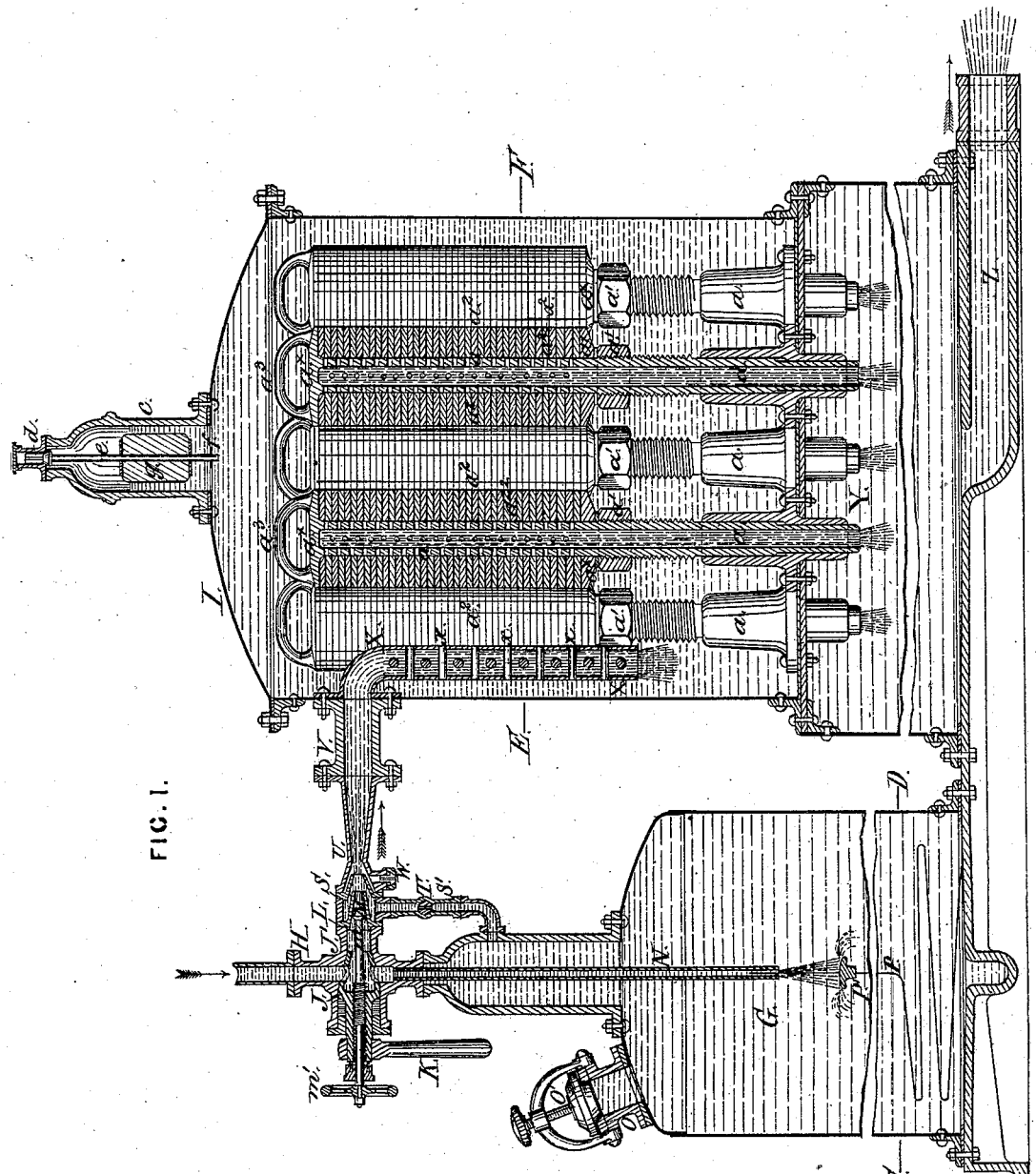

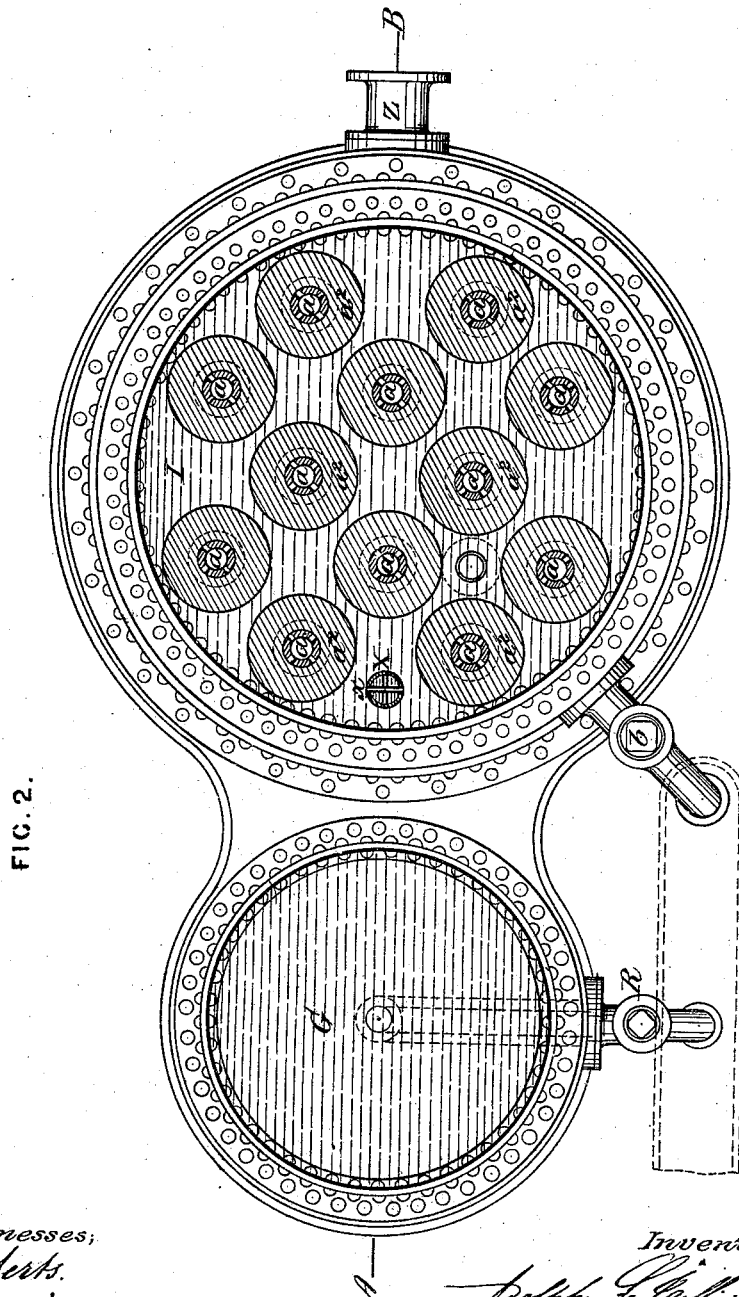

ADOLPHE LE TELLIER, OF BRUSSELS, BELGIUM.

IMPROVEMENT IN WATER FILTERS AND PURIFIERS.

Specification forming part of Letters Patent No. 169,362, dated November 2, 1875; application filed July 10, 1875.

*To all whom it may concern:*

Be it known that I, ADOLPHE LE TELLIER, of Brussels, in the Kingdom of Belgium, have invented Improved Apparatus for Purifying and Filtering Water, of which the following is a specification:

This invention has for its object the purification of water previous to use in industrial operations, either for the various operations where water is used as a washing or dissolving agent, assisting in production, or as a component of the manufactured product, or to be used for the feeding of steam-generators. Experience and researches on waters of all kinds destined for industrial uses show that they vary much in the proportion of substances they contain in solution or suspension, according to the soils they have passed through.

By the hydrometrical method the composition of water is determined, at least very proximately. Each hydrometrical degree (according to the French method of Boutron and Boudet) of analyzed water represents a tenth of a gram of soap, which would be decomposed for the neutralization of the salts dissolved in a liter of water. This soap forms in the water, as pure loss, insoluble and perfectly useless clots. A hydrometrical degree corresponds to a hundredth of a gram of carbonate of lime in a liter of water. Waters, according as they register a high degree to hydrometrical analysis, to that extent are hard and unfit for various industrial uses, and leave in boilers deposit and incrustation. Reciprocally, waters which, on hydrometrical analysis, show a lower degree are the best, and are those which give the most economical manufactures, the finest quality of products, and leave the least incrustation and deposit on evaporation in boilers.

The object of this invention is to purify hydrometrically water before its use—that is to say, to eliminate from it salts and other compounds which cause it to show a high hydrometrical degree, in order to reduce it to as low a degree as possible.

The principal salts in solution in water—those which by their qualities heighten the most the hydrometrical degree—are the neutral carbonate of lime and the bicarbonate of lime, formed by the combination of lime with carbonic acid, and the sulphate of lime, formed by the combination of lime with sulphuric acid. If water contained only the neutral carbonate of lime, which it can dissolve naturally, only small quantities would be found in it; but the presence of carbonic acid enables the water to dissolve more considerable quantities of the carbonate of lime. Often water contains, in addition, an excess of free carbonic acid. Besides the bodies described, which water holds in solution, it contains, also, in indeterminate, but often considerable, proportions, organic matters, molecules of sand, clay, detritus, &c., in suspension.

The hydrometrical purifying apparatus hereinafter described is constructed and combined for the elimination, as completely as possible, by means of reaction, first, and then of filtration, of the carbonates and sulphates of lime, of free carbonic acid, and of all foreign bodies in suspension.

By mixing with water containing carbonate of lime a certain quantity of clear caustic-lime water the carbonic acid is neutralized, and the soluble bicarbonate of lime is brought to the state of insoluble carbonate of lime, which is precipitated. All water containing sulphate of lime is treated with carbonate of soda, insoluble carbonate of lime is precipitated, and soluble sulphate of soda remains, which produces no deposits in boilers, and is harmless in operations.

These two methods of chemical reaction have been in use for a long time. It is not in them that the invention consists, but in the arrangement and combination of apparatus for effecting the various operations necessary for reducing the hydrometrical degree of water. The apparatus acts on the principle of dissolving the chemical reagent, proportionally introducing the chemical reagent, and intimately mixing it with the water to be treated, thus producing the change of the soluble salts into insoluble ones, precipitated in the molecular form, elimination of the free carbonic acid by the mixture of a certain quantity of air, which, with agitation and shocks of masses of water thrown into the apparatus, draws the carbonic acid, and escapes with it by a valve; and, lastly, filtration, which gives, as a definite result, purified water, free from the salts in solution, and from molecules and insoluble matter, either organic or combined.

The hydrometrical purifying apparatus hereinafter described enables operations hitherto confined to the laboratory to be carried out on a practical scale and applied industrially.

In the accompanying sheets of drawings, Figure 1 represents, in vertical section on the line A B of Fig. 2, the hydrometrical purifier, with multitubular filter, forming the subject of this invention; and Fig. 2 is a sectional plan on the lines C D and E F of Fig. 1.

The filter, forming part of the apparatus, is constructed with a number of compound filtering-cylinders, each composed of a metal tube, $a$, perforated with holes for a part of its length, and surrounded by washers or layers $a^2$ of felt or other filtering material, compressed between two plates, $a^\times$, by means of a screwed nut, $a^1$. Each of these filtering-cylinders, considered separately, presents, as a surface available for filtration, the developed surface of the cylinder—that is to say, the product of the circumference multiplied by its length. The total power of filtration is the product of one of these surfaces multiplied by the number of cylinders contained in the envelope or casing.

The purifier is composed of two cylindrical bodies, of sheet-iron, on the same cast-iron base. G is the vessel where the previous solution of the chosen chemical agent takes place. At H are shown the arrangements for introducing the mass of water to be treated, that which has to dissolve the reagent, the proportional quantity of this reagent, and the quantity of air necessary for the withdrawal of the free carbonic acid. I is the filter, where the mixed and precipitated water agglomerates, and whence, lastly, it comes out filtered and purified. The water to be purified enters the apparatus by a valve or cock, provided with a stuffing-box, as shown. This valve is worked by the key K. This valve being opened, a part of the water proceeds to feed the vessel G by the pipe N. It is necessary that the entering water should have a pressure of about three meters. The plug J of the valve is hollow, so that the water has a way through the chamber J', which is prolonged by a conical pipe, L, in which is fitted, as an obturator, the conical part M of a spindle, $m$, part of which is threaded, and passes through the head of the plug J of the valve, which serves as a nut for it. The spindle is provided with a hand-wheel, $m'$, by means of which the pipe L can be blocked or opened gradually and proportionally to the quantity of water to be purified. The vessel G has a cast-iron tube, O, with cover O', made readily removable, as shown. By means of this tube a quantity of lime, previously slaked in one and a half time its weight of water, is introduced into the vessel G. A rod, P, formed into a spiral spring, rests at the bottom of the vessel G. This rod is provided with a small button or projection, P', and the upper extremity of the rod enters the tube N. This spring is to agitate the milk of lime during the working of the apparatus by the slight movements and vibrations of the spring caused by the water under pressure acting in a jet on the button. The cleansing of the vessel G is accomplished by means of a cleansing tap or cock, R, communicating with the bottom, Fig. 2. The water arriving under pressure having filled the vessel G, supposing the obturator M to be open, the overflowing water escapes in the form of a jet. Animated by the speed due to the fall, this jet is projected into a second pipe or nozzle, S, which communicates with the vessel G, containing the lime-water, by a pipe, S', provided with a tap or valve, T. This is proportionally opened, to allow the quantity of clear caustic-lime water necessary for the reaction to pass. This water is in the vessel G under pressure, and directs itself, therefore, toward the open outlet. Moreover, the jet which escapes from the pipe L, entering the pipe S, forms behind it a suction, which draws the lime-water. The pipe S in its turn directs the jet thus composed of water and lime-water into the third conical pipe, U, which is prolonged by an inverted conical pipe, abutting on the tube V, entering the filter. At this moment the section of the jet is the greatest, its speed is diminished, and its pressure changed. The mixed jet of water, leaving the second pipe S, forms behind it a suction, which raises a small valve, W, and draws with it a certain quantity of air, which has just been added to the composition of the whole jet in the pipe U. This compound jet enters the filter by the tube V. It is directed toward the bottom by a tube, X, where it meets, as obstacles, fixed bars $x$, which cross this tube in various directions, so that the vein of water arriving in the filter I under the initial pressure is divided and broken on these obstacles.

The filter I is filled and the filtration takes place by each of the tubes $a\ a\ a\ a\ a$, &c. The filtered product collects in the capacity of the basement Y, and flows away by the tube Z. The filter I is cleaned by the cleansing-tap $b$, which communicates with the bottom, and allows of the expulsion of the residues of filtration and precipitation. On the top of the cover of the filter I is placed a tube, $c$, which incloses a valve, $d$. This valve is prolonged by a rod, $e$, on which is placed a float, $g$, of a certain volume. The rod $e$ is guided at the upper part by the valve $d$, and below by a central guide at $f$. This valve works, therefore, from below upward. It works under the force of the interior pressure, and under the force of the float, which only rises with the level of the liquid, so that this valve always remains open when a sufficient quantity of air or gas occupies a space in the upper part of the filter I and of the tube $c$, to prevent the liquid acting on the float.

In apparatus for industrial purposes double fittings may be employed.

In apparatus to purify for feeding steam-generators the filters should be at least four times more powerful than is absolutely necessary, because of the intermittence of the suction, so that the filter of a purifier may be able to work for a whole week at least, or even a fortnight, without being thoroughly cleaned, and that the frequent expulsion of the residues by the cleansing-tap may suffice to insure proper working during the whole of that period.

The improved multitubular filter may be used alone when it is required to purify the water by eliminating the matters in suspension only without acting on the salts in solution.

When the filter is constructed to be used alone the water to be filtered is led under a certain pressure into the capacity of the filter by the tube. Under the action of that pressure it traverses the filtrating mass, passes through the holes in the cylinders or tubes into their central conduits, down which it flows into the lower chamber of the filter, which receives the whole of the filtered water, which flows out as required by the exit-pipe. This capacity is made sufficiently large, so that even if it were desired to draw the water by means of a pump no disarrangement of the filtrating mass would ensue, since the suction would act on the intermediate mass of filtered water in the lower chamber. This filter will act either under a slight pressure (less than a meter) or under a stronger one. The pressure, however it be given, is invariably the motive power of the filtration.

By means of the screw and nut $a^1$ of each cylinder or tube the washers or layers $a^2$, which compose the filtrating mass, can always be compressed, so that the obstacle opposed to the passage of the water may be proportional to the force of the pressure.

The matters deposited by the water are retained by the filtrating media at the peripheries, which are vertical. By this arrangement, although the direction of the filtration is horizontal, the agglomerated matters, after attaining a certain thickness, cannot remain suspended; their weight causes them to fall to the bottom, when, by opening the cleansing-tap, they may be evacuated.

To clean the filter each tube is successively taken by the handle $a^3$ at its upper part, and, after the surface of the tube has been submitted to a washing or exterior brushing, the nuts are removed, and the filtrating-washers of felt are withdrawn, so as to enable them to be washed in the most complete manner. Thus the apparatus is efficaciously cleansed, and, after replacing the washers of each tube under the compression of the screw, and each tube in its bed, the filter is in the same working condition as if it were new.

For the filtration of large quantities of water in a given time, such as the filtration of the feeding-water for a town, several sets of apparatus may be arranged in a group or groups.

It will be evident that other constructions of apparatus may be made to act on the same principle as the arrangement shown in the drawings without departing from the distinctive character of this invention.

The filtering-chambers, instead of being circular, may be of square or other cross-section, and their number may be varied to suit circumstances.

I claim—

1. The combination, in apparatus for filtering water, of a vessel, G, fed by a pipe, N, provided with means for regulating the supply, the said pipe being arranged in conjunction with a rod, P, provided with a button or projection, P′, and forming an agitating-spring, as and for the purposes specified.

2. In combination with the tube N and vessel G, the chamber J′, hollow plug J, threaded spindle $m$, obturator M, pipe or nozzle L, pipe or nozzle S, pipe S′, tap or valve T, and conical pipe U, all arranged and operating together as and for the purposes specified.

3. The combination of the filter I, perforated tubes $a$, and filtering-washers $a^2$, as described, with the purifying-vessel G, tube N, and the connections S S′ T U V, as and for the purposes specified.

4. The compound filter composed of perforated tubes $a$, surrounded by washers or layers of felt, or other suitable filtering material, $a^2$, compressed and held in place by screws, the whole inclosed in a proper casing, as and for the purposes specified.

5. The combination of parts comprising the vessel I, tubes $a$, washers $a^2$, plates $a^x$, handles $a^3$, screwed nuts $a^1$, basement Y, tube Z, tap $b$, tube X, bars $x$, tube $c$, valve $d$, rod $e$, guide $f$, and float $g$, forming the improved multitubular filter shown in the drawings.

ADOLPHE LE TELLIER.

Witnesses:
J. B. AERTS,
E. VAN DOIRON.